Aug. 15, 1961     C. R. PERRY ET AL     2,995,931
AUTOMATIC SAMPLER
Filed July 12, 1957
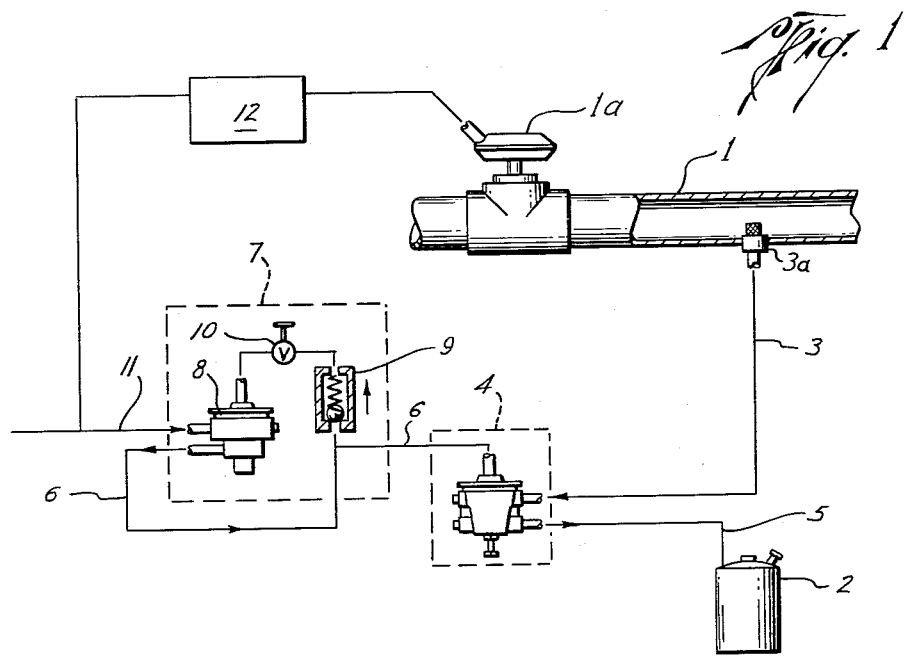
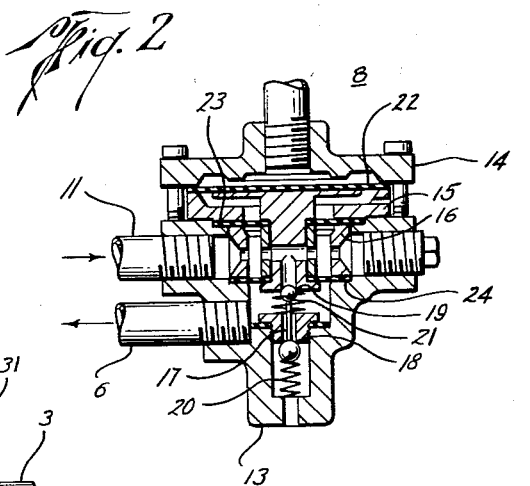
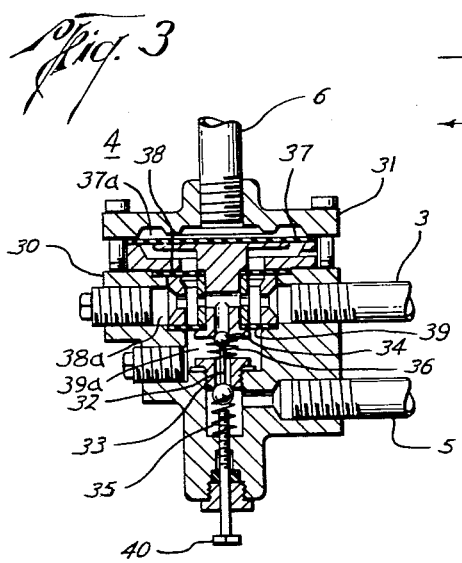
CHARLES R. PERRY
HAROLD F. BAKER
INVENTORS
BY
ATTORNEYS

United States Patent Office 2,995,931
Patented Aug. 15, 1961

2,995,931
AUTOMATIC SAMPLER
Charles R. Perry and Harold F. Baker, Odessa, Tex., assignors to Sivalls Tanks, Inc., Odessa, Tex.
Filed July 12, 1957, Ser. No. 671,654
14 Claims. (Cl. 73—198)

The present invention is related to apparatus for obtaining samples of a fluid.

In general, large bodies of fluid mixtures must often be sampled for various reasons. Usually it is desired that the sample be truly representative of the fluid body sampled even though the latter varies in composition throughout its volume. The most feasible plan is to take a large number of small sample increments from points scattered over the volume of the sampled body. The present invention is embodied in apparatus for taking sample increments from fluid bodies sampled.

The dump-type positive displacement meter is an example of apparatus which defines the limits of bodies of fluids to be sampled. These meters are employed in the oil fields to determine the gross fluid produced for such purposes as individual well tests, production in accordance with a lease, measurement of co-mingled oil produced from different formations, etc. It is commonly desirable to determine the proportions between the oil and water content of the fluids produced in order to arrive at the net oil produced.

In order to determine the oil and water proportions, it is desired to take automatic samples to form a composite sample of all the fluid of each volume which may be dumped by the positive displacement meter. Practically speaking, the fluid to be sampled is not homogeneous, and it is desirable that a large number of small spot samples of each batch of the dump-type meter be obtained.

It is also quite feasible to apply the invention to apparatus which extracts fluid samples from a continuously flowing body of fluid in a conduit. In other words, the body of fluid to be sampled may not be physically broken up into batches by a positive displacement meter but may be simply a flowing stream which varies in composition.

The sampling might well be desired on a continuous basis. The apparatus in which the present invention is embodied could be manually controlled to start and stop its sampling over any desired period. Further, time-cycle mechanisms could establish the operation of the apparatus over a series of predetermined periods of time.

Thus it is to be made clear that the present invention extracts increments of sample fluid from a body of fluid defined in any number of ways. The sampled body may be such only in the broad sense that it is flowing through a conduit. The sampled body could be defined by a large container, and apparatus could be provided to shift the sampling point through the container as required to obtain a collection of samples which are representative of the sampled body of fluid. On the other hand, the dump-type positive displacement meters mentioned above represent apparatus which offer still another way of defining bodies of fluid to be sampled by the apparatus of the present invention.

The present invention is embodied in apparatus including an intermitter, or source of power pulses. This device delivers pneumatic pulses which are sharp and well-defined. Further, the structure of the intermitter can be adjusted to fix the magnitude of the pulses. Finally, the device is adjustable to set the rate at which the pulses are delivered. Essentially, these functions are specifically carried out with a three-way valve without a neutral position having an input supply of pneumatic pressure fluid and forming a combination with a feed-back control loop from its output to its actuating motor which has a time-delay function which is adjustable to establish the rate and magnitude of the output pulses produced by the combination.

The apparatus embodying the invention also includes a pump operated by the intermitter pneumatic output pulses to create a suction on the sampling point within the sampled body. The result is to draw increments of fluid sample into the pump. The increments are then expelled to the collection point as each pulse decays in magnitude. These pump functions are specifically performed with a two-way valve having a motor actuated by the intermitter pulses and connected to the sampling and collection points by suitable connections. Finally, an adjustment is provided to limit the stroke of the two-way pump valve in establishing the size of the increments of sample extracted by each power pulse from the intermitter.

Any analysis of the structural embodiment of the invention should be based on initially recognizing the two main sections described above. The first section is the intermitter which provides a pulsating pneumatic impulse signal. The second section is a pump which is actuated by the pneumatic impulse signals of the intermitter to draw samples from the defined body of fluid at a sampling point and deliver them to a collection point. The invention makes possible the complete system of apparatus, including the apparatus to define the sampled body of fluid, the source of power pulses, the extracting pump and the collection system, but it is not limited thereto. The invention may also be said to provide a unique source of power pulses which can be adjusted to deliver the pulses at a predetermined rate in meeting a wide variety of requirements of systems in which it may be incorporated.

The intermitter and pump, as a unit, represents still another scope of the invention. This intermitter-pump unit can be used in a wide variety of systems requiring removal of fluid increments from one point to another. The intermitter may be controlled in the various ways indicated heretofore. The pump may be connected to several different forms of fluid transport systems. The intermitter-pump combination can be appreciated as unique in its particular arrangement of structure and resulting function in transfer of fluid quantities from one point to another.

A broad object of the invention can now be seen as providing a source of pneumatic power pulses with a three-way valve and time-delay control circuit between its output and actuating motor.

Another object of the invention is to provide a feed-back control loop for a source of pneumatic power impulses which will form the pulses sharply, or well-defined, and which can be adjusted to establish the magnitude and frequency of the pulses.

Another object of the invention is to provide a structure for pumping fluid, between points, in increments whose magnitude and frequency are adjusted by means of a time-delay feed-back control loop.

Another object of the invention is to provide a system for sampling fluid from a defined body of fluid in increments whose magnitude and rate are adjustable by means of a time-delay feed-back control loop.

Other objects, advantages and features of this invention will become more apparent to one skilled in the art upon a consideration of the written specification, the appended claims and the attached drawings wherein:

FIG. 1 is a diagrammatic illustration of a complete system in which the invention is embodied;

FIG. 2 illustrates a part of the invention as a diagrammatic sectioned elevation of the motor-operated three-way valve of the intermitter unit establishing a cycling impulse to operate the pump; and FIG. 3 illustrates a part of the invention as a diagrammatic sectioned elevation of the two-way valve pump operated by the output of the intermitter unit.

General system

FIG. 1 has been established to give an appreciation of the over-all function of a system embodying the invention as it extracts a sample from fluid conduit 1. The object is to extract a sample from conduit 1 and deliver it to container 2. Conduit 1 is only one of many possible ways of defining a fluid to be sampled. Valve 1a, together with conduit 1, sets the limits of the body of fluid sampled. Of course, this conduit-container 1 could be a tank of much larger size than the conduit. Further, the valve 1a could be eliminated if the sampling desired were simply that of fluid flowing continuously through conduit 1. In general, however, the illustration of a sample taken from conduit 1 and delivered to container 2 is sufficient to demonstrate the concept of the invention.

The sampling point in conduit 1 should be specifically considered. Particular circumstances could call for a more elaborate arrangement than shown here. If a tank, or some container much larger than the simple conduit 1 illustrated, were defining the sampled body, the sample point might have to be shifted with some form of apparatus to insure that the collection of sample increments taken from all points truly represent the contents of the container. FIG. 1, however, simply illustrates that a pipe 3 is connected to a strainer 3a downstream of valve 1a. Pump 4 creates a suction on pipe 3 and draws the sample increments through the strainer and from the conduit 1. Then pump 4 delivers the sample increments to pipe 5 which takes them to the collection point of container 2.

The pump 4 responds to power pulses in extracting the sample increment from pipe 3 and delivering it to pipe 5. Essentially, the pump 4 mechanism is a two-way valve which is reciprocated. At least part of the invention is embodied in structure which develops the power pulses which reciprocate the valve-pump. In carrying out the objects of the invention, the structure developing the power pulses controls their frequency and magnitude and thereby controls the speed of the pump as it takes a sample from conduit 1 and delivers to container 2.

The power pulses developed to control the speed of reciprocation of pump 4 are transmitted to pump 4 by pipe 6. These power pulses are the output of intermitter 7 which is provided with a feed-back loop establishing their rate and magnitude as well as insuring they are clean and well-defined. The specific structure illustrating the invention embodied in the intermitter is to be considered in three components to give full appreciation to its function as a combination.

The first component of the intermitter, and the one which basically characterizes it, is a diaphragm-operated, reverse-action, three-way pilot valve which has no neutral position. This valve 8 connects pipe 6 to either atmosphere or the pneumatic supply pressure for the system. The valve is shifted to either position, depending on the relation of the forces developed on its diaphragms as will be explained in detail in connection with FIG. 2.

The second component of the intermitter is a check valve 9. A spring-loaded ball check valve 9 has been diagrammatically illustrated as in the feed-back control loop from intermitter output pipe 6 to the main diaphragm of valve 8. The seat of valve 9 is notched to permit flow of pneumatic pressure fluid from the main diaphragm to pipe 6 when valve 8 vents pipe 6 to atmosphere.

The third component of the intermitter is a needle valve 10. Flow through the valve, to and from the main diaphragm of 8, is adjustably throttled in accordance with its manual setting.

Check valve 9 and needle valve 10, together with their connecting piping, complete the feed-back control loop between the main diaphragm of three-way valve 8 and output pipe 6. The strength of the spring of check valve 9, the size of the notch of its seat, and the setting of needle valve 10 function to establish the magnitude of the pneumatic pulses of the output, their frequency, and their shape, on a time basis. The output of intermitter 7, in pipe 6, then becomes the input to pump 4, cycled in magnitude to reciprocate the pump-valve at their frequency in order that the sample increments be taken from conduit 1 to container 2.

The source of pneumatic pressure for the system is not shown. However, it is easily understood as being applied to pipe 11. The application of this source to pipe 11 is illustrated in FIG. 1 as controlled by a meter-controller 12. Although meter-controller 12 is merely indicated diagrammatically, it can be easily appreciated as functioning to simultaneously define the fluid in conduit 1 to be sampled, by manipulation of valve 1a, and applying the source of pneumatic pressure to pipe 11 to cause the sampling function to begin.

Meter 12 may be regarded as the dump-type positive displacement meter mentioned heretofore. A batch of fluid to be sampled is defined by periodic opening of valve 1a. At the same time this batch is allowed to flow through conduit 1, the supply is applied to pipe 11. The sampling period is fixed by the time meter 12 keeps pipe 11 in communication with the source of pneumatic pressure.

It must again be emphasized, however, that the operation of the invention is not dependent upon the specific system disclosed in FIG. 1. The supply of pneumatic pressure could be applied manually to pipe 11, or by a time-cycle controller, without direct dependence on the manipulation of valve 1a. There are many ways to coordinate the sampling period with the establishment of the fluid body to be sampled just as there are many ways to define the sampled fluid body itself. Whichever of these techniques are employed, the disclosed structure embodying the present invention is combined with them to extract finite increments of fluid sample at a rate and magnitude set by the feed-back control loop of the source of intermittent power pulses for the reciprocating valve-pump.

Intermitter

FIG. 2 is used to illustrate the internal structure of three-way valve 8 as it is actuated to its alternate positions by diaphragm motors. The casing of the valve is formed of body 13 and cover 14. The cover is bolted to the body and brings housing 15 and spool 16 together in the internal cavity of body 13 in order to space the diaphragms within the cavity and form chambers with them.

The dominant structure within the casing is the pilot plug 17 having a valve element on each end. The lower valve has a seat member 18 gasketed to the atmospheric exhaust passage in the bottom of the casing. A spring 20 within the casing is arranged to urge the pilot plug upward to seat its lower valve element on seat 18. A spring 21 is arranged about the plug to exert force upward on the movable seat 19.

Seat 19 is movable because it is located on a spindle structure. This spindle within body 15 carries seat 19 on its lower end, is urged upward by spring 21 and is moved downward by sufficient pressure on top of main diaphragm 22. The spindle also forms a solid link between snapper diaphragm 23 and differential diaphragm 24 by being fixed to them at their centers.

It must be specifically noted that main diaphragm 22 receives the pneumatic impulses on its top, from the feed-back loop, while its under side is vented to atmosphere. The upper side of snapper diaphragm 23 is correspondingly vented to atmosphere while the chamber formed between diaphragm 23 and differential diaphragm 24 receives the supply pneumatic pressure of pipe 11. A passage within the spindle, to seat 19, provides for the valving of this supply to the chamber below differential diaphragm 23. As the chamber below diaphragm 24 is connected to pipe 6 directly and valved to atmosphere across seat 18, it is obvious that if pilot plug 17 is not given a neutral position, its valves will alternate communication of pipe 6 between the supply pressure of pipe 11 and atmosphere.

The function of this structure may now be considered from when the pressure on the top of diaphragm 22 increases. The force of spring 21 and the differential between the forces on diaphragms 23 and 24 are overcome to move the spindle downward. As the spindle moves downward, carrying seat 19, the upper valve of plug 17 seats and terminates communication between pipes 6 and 11. As soon as the upper valve seats on 19, the continuing downward movement of the spindle against the force of spring 20 unseats the lower valve from seat 18. Thus pipe 6 is vented to atmosphere. Venting pipe 6 to atmosphere quickly increases the differential across diaphragm 24, giving an added component of force downward on the spindle to result in an acceleration to the function of venting pipe 6. This accelerating function, which results from venting the chamber beneath diaphragm 22, may be more descriptively termed a "snapping" action.

To reverse the motion of the spindle and move it upward, the pneumatic pressure applied to diaphragm 22 is reduced to the value less than the upward force exerted by springs 20 and 21 and the force upward generated by the supply pressure acting on the areas of diaphragm 23 and 24, the area of 23 being larger than that of 24. Movement of the spindle upward seats the lower valve element of plug 17. Spring 20 maintains this seating of the valve element on seat 18. As the spindle continues upward, the seat 19 leaves the upper valve element of plug 17. The resulting decrease in differential across diaphragm 24 adds to the resultant upward force on the spindle. The resulting acceleration of the spindle movement upward makes the switch-over of communication between pipe 6 and pipe 11 very positive and sharp. The acceleration of the valving function, produced by this arrangement of structure, produces a clean, sharp connection and disconnection between pipes 6 and 11 if the magnitude of the pressure impulses imposed on the top of diaphragm 24 are cycled positively between their minimum and maximum values. Of course, as indicated heretofore, the feed-back control loop from the output of the pilot 8 itself provides the positive variation between the required pressure and pulses for diaphragm 22.

From a broad viewpoint, the feed-back loop, including valves 9 and 10, routes the output of pipe 6 to the top of diaphragm 22. The spring of valve 9 establishes the maximum value to which the pressure in pipe 6 must rise before the ball valve comes off its seat and passes the pneumatic pressure to needle valve 10. In this way, the spring of valve 9 insures that pipe 6 is fully pressured before valve 8 vents it to atmosphere and the increasing portion of the pulse passed to pump 4 and is sharp and well defined. The fluid pressure pulse formed by check valve 9 is then applied to diaphragm 22 through needle valve 10 at a rate set by its opening. The pulse, controlled by both valve 9 and valve 10, positively actuates the valve 8 in snapping pipe 6 into communication with atmosphere.

It is feasible for needle valve 10, alone, to apply the required pneumatic pulse to diaphragm 22. However, the criticalness of adjusting needle valve 10 is decreased by utilizing check valve 9 in series with it. In any event, these restrictive components, in a control loop from pipe 6, set the time-delay for the actuation of valve 8 that insures pipe 6 is fully pressured by pipe 11 before pilot valve 8 is snapped to vent pipe 6 to atmosphere.

After pipe 6 has been vented to atmosphere by valve 8, the resulting differential across the restrictive elements in the feed-back loop to diaphragm 24 will start a reversal of flow of the gas in the loop. The notch in the seat of valve 9 passes this relatively small quantity of gas to pipe 6. Needle valve 10 is set to properly throttle the reversing gas flow as it regulates the pressure decrease from the top of diaphragm 22. This throttling by valve 10 establishes the period which insures pipe 6 is completely vented before pilot valve 8 is again snapped in connecting supply pipe 11 to pump input pipe 6.

The decreasing portion of the pulse of pneumatic pressure in pipe 6 is rendered sharp and well defined by this snapping function.

It should now be clear that the feed-back loop from pipe 6 to the main diaphragm 22 of valve 8 provides a time-delay to the function of valve 8 which produces sharp, well defined pulses of pneumatic pressure for powering pump 4. Further, the adjustability of the valve restrictions in the loop provide for setting the frequency with which the pulses are delivered to pump 4.

The invention was reduced to practice with a 3PS Snapper Pilot, manufactured by Kimray, Inc., Oklahoma City, Oklahoma, as valve 8. The volume between the needle valve and the main diaphragm of this device proved to be quite important in obtaining the maximum frequency for the pulses produced. As a practical matter, only about 0.5 cubic inch was required for this volume to obtain eighty pulses per minute. It is thus apparent that the amount of air passed through the valves of the feed-back loop is quite small and the settings of the restrictive elements must correspondingly be finely adjusted in establishing the required time-delay between pulses. However, with the power pulses established in pipe 6, in this manner, the actuation of pump 4 with them can be analyzed as it transfers increments of sample from pipe 3 to container 2.

*Pump*

The pump structure of FIG. 3 is generally similar to the structure of valve 8. The actual reduction to practice employed a 3PG pilot, also manufactured by Kimray, Inc. The capacity of this device, as a pump, proved to be capable of transferring one quart of liquid with 2000 strokes. Further, the pump was found to be capable of discharging against pressures up to 12 p.s.i. A simple structure, provided as disclosed here, limits the length of the pump stroke, to enable the quantity pumped per stroke to be decreased to practically any finite small quantity.

In similarity to valve 8, pump 4 has a body 30 and cover 31 which are bolted together to form a casing within which a pilot plug 32 has valve elements co-operating with seats 33 and 34 in the same general physical arrangement of FIG. 2. A spring 35 urges the lower valve against seat 33 and spring 36 urges seat 34 away from the upper valve. A spindle also solidly links main diaphragm 37, diaphragm 38 and diaphragm 39 to form chambers 37a, 38a and 39a. The main diaphragm is vented to atmosphere on its lower side and, correspondingly, diaphragm 38 is vented to atmosphere on its upper side. To this extent, the structure of valve 8 and pump 4 are substantially the same. However, there are material differences.

In general, pneumatic pulses placed in chamber 37a, on top of diaphragm 39, reciprocate the spindle and valve elements of pump 4. As the valve plug 32 is reciprocated, it alternates the communication of chamber 39a between chamber 38a and the chamber below the lower valve. It is clear, from the illustration of FIG. 3, that chamber 39a communicates only with either pipe 3 or pipe 5, through the valves of plug 32. This arrangement is quite different from that of FIG. 2, forming a two-way valve which is utilized to transfer fluid. The length of stroke for plug 32 is set by a mechanical stop, or abutment, member 40 which is manually adjusted externally of the casing.

To thoroughly appreciate how transfer of fluid takes place across the seats of valve plug 32, the inertia of the fluid in motion must be taken into account. First, consider the down-stroke of plug 32, urged by the spindle-movable seat 34 on the upper valve. Obviously, the volume of chamber 39a decreases. The lower valve of plug 32 simultaneously unseats from 33. The result is movement of fluid across seat 33 and into conduit 5.

Reversal of spindle motion increases the volume of chamber 39a. Without a consideration of the inertia of the moving fluid which had just been forced into conduit 5, it would be assumed that the fluid would be drawn back into chamber 39a which it had just left. However, the upward motion of the spindle occurs so rapidly under the sharp power impulses from intermitter 7 that the lower valve of plug 32 is seated on 33, under the force of spring 35, before the increasing differential across the seat 33 can reverse the flow of the fluid which had just been forced into conduit 5.

Next, consider seat 34 as continuing upward, with its spindle, and the concomitant expansion of the volume of chamber 39a. The differential across seat 34 forces fluid from conduit 3 across seat 34 and into chamber 39a.

The spindle again reverses directions under the force of an increasing impulse in chamber 37a. Seat 34 and its spindle is carried downward with consequent decrease in volume of the chamber 39a. The resulting pressure differential across seat 34 is in the direction to drive fluid back across the seat into conduit 3. However, the inertia of the fluid again prevents any significant, actual, reversal of the flow across seat 34 during this period and a finite quantity of fluid is trapped in chamber 39a to be forced across seat 33 as the spindle continues downward as described above. This cycle of reciprocation, repeated in accordance with the frequency of the pneumatic impulses applied to chamber 37a on top of diaphragm 37, results in a continuing transfer of finite increments of fluid sample from conduit 3 to conduit 5.

Conclusion

The disclosed embodiment of the invention is marked by its simplicity and ruggedness. As indicated, the two main components use valve mechanisms which are standard items of manufacture, given only the modification necessary to incorporate the inventive features of the present disclosure into a complete combination.

The arrangement of the pilot valve 8, check valve 9 and needle valve 10, to form intermitter 7, has no comparison in the prior art on the basis of simplicity. This particular arrangement is remarkably trouble-free in operation. Note that with the needle valve installed between the main diaphragm of the three-way valve 8 and the check valve, the output air alternates its direction of flow. Therefore, it is swept free from any foreign matter in the fluid which would otherwise tend to plug the valve with unidirectional flow through it. As a complete combination in itself, the intermitter, with its adjustable feed-back control loop, demonstrates a material contribution to the art of producing pneumatic power pulses.

The sample pump is also quite rugged and well adapted to service in combination with the intermitter. The choice of a diaphragm type of sample pump has the distinct advantage of resisting fouling by corrosion and sand. Foreign matter of this nature does not have close-fitting, critically sized parts to mar in this type of pump. Further, the particular commercial structure available was easily modified, with the adjustable abutment 40, to pump as small a quantity of fluid per stroke as desired. The combination of the intermitter and pump, as a unit, for the transfer of fluid from one point to another, is a material contribution to the art.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A sampling system for fluids including: a flow conduit for the fluid to be sampled; a flow valve controlling flow through said conduit; a meter connected to the flow valve to periodically open and close the same and also connected to a source of pneumatic pressure fluid to permit the flow of the same while the flow valve is open and to interrupt such flow upon closing of the flow valve; an intermitter producing a series of pressure pulses while the meter permits flow of said pneumatic fluid including a first flow connection to the meter for receiving pneumatic pressure fluid therefrom, a second flow connection to exhaust, and a third flow connection, a two-position valve arranged to alternately fluidly connect the third connection to the first and second connections whereby the third connection is alternately pressurized and exhausted, a pressure actuated motor means connected to the valve to position it to fluidly connect the third and first flow connections responsive to application of pressure fluid to the motor means and to fluidly connect the third and second flow connections responsive to removal of pressure fluid to the motor means, and a restricted flow connection between the third flow connection and the motor means through which pressure fluid in the third flow connection flows to actuate the motor means so that flow in the third flow connection occurs as a series of timed pressure pulses consisting essentially of a single line of tubing, a check valve having a bleed by-pass disposed in the line, and means for adjustably restricting the line disposed in the line in series with the check valve; and a pump connected to said conduit downstream of the flow valve therein to pump finite increments of the fluid being sampled to a sample receiver, said pump having a motor means connected to the third flow connection and actuated by the pressure pulses occurring therein to operate the pump.

2. A sampling system for fluid including a meter responsive to the presence of a body of fluid to be sampled; a source of pneumatic pressure controlled by the meter; an intermitter responsive to pneumatic pressure applied to it by the meter to produce a series of pressure pulses including a housing, a first connection from the source of pneumatic pressure; a second connection to exhaust, a third connection to output from the intermitter, a two-position valve disposed to alternate communication of the third connection with the first and second connections, a pressure responsive diaphragm motor means disposed in the housing to actuate the valve, comprising a main diaphragm, a movable link connected to the main diaphragm, diaphragms connected to the link and housing to form chambers within the housing permanently communicating with the first and second connections, said valve having a passageway providing communication between said chambers, a valve seat and a valve closure member cooperable therewith to control flow between said chambers; and a restricted connection between the third connection and the diaphragm motor means, disposed to feed back output pressure upon a surface of said main diaphragm to actuate the valve.

3. The system of claim 2 wherein two diaphragms are connected to the link and housing to form chambers and one of said diaphragms has a surface constantly exposed to pressure from said first connection and an opposite surface alternately exposed to pressure from the first and second connections, whereby snap action is imparted to the valve.

4. The system of claim 2 in which said passageway is in said link, the valve seat is located on the link at the end of said passageway, and a spring is disposed within the housing to urge the movable link and seat away from the valve closure member.

5. The system of claim 4 wherein a second passageway is disposed in the housing between the second connection and the chamber within the housing permanently communicating with the third connection, a second valve seat is located on the valve housing and the second passageway, a second valve closure member connected to the first mentioned valve closure member is disposed to cooperate with said second seat to control flow through said second passageway, and a spring is arranged within the housing to urge the second valve closure member toward the second valve seat.

6. The system of claim 2 wherein the restricted connection between the third connection and the diaphragm motor means consists essentially of a single line of tubing; a spring loaded check valve having a bleed by-pass disposed in the line; and means, in series with the check valve, for adjustably restricting the line.

7. In a sampling system for fluid wherein an intermitter is disposed to charge applied pneumatic pressure into a series of pressure power pulses, that improvement which comprises an intermitter including a housing; a first connection from a source of pneumatic pressure, a second connection to exhaust and a third connection to output from the intermitter; a two-position valve disposed to alternate communication of the third connection with the first and second connection; a pressure responsive diaphragm motor means disposed in the housing to actuate the valve comprising a main diaphragm, a movable link connected to the main diaphragm, and diaphragms connected to the link and housing to form chambers within the housing permanently communicating with the first and second connections; said valve having a passageway providing communication between said chambers, the valve seat and a valve closure member cooperable therewith to control flow between said chambers; and a restricted connection between the third connection and the diaphragm motor means disposed to feed back output pressure upon a surface of said main diaphragm to actuate the valve.

8. The system of claim 7 wherein two diaphragms are connected to the link and housing to form chambers and one of said diaphragms has a surface constantly exposed to pressure from said first connection and an opposite surface alternately exposed to pressure from the first and second connections, whereby snap action is imparted to the valve.

9. The system of claim 8 in which said passageway is in said link, and the seat is located on the link at the end of said passageway, and a spring is arranged in the housing to urge the movable link seat away from the valve closure member.

10. The system of claim 8 in which a second passageway is provided between the second connection and the chamber in the housing permanently communicating with the third connection, a second valve seat is located on the valve housing around the second passageway, a second valve closure member is connected to the first mentioned valve closure member and is disposed to control flow through the second passageway, and a spring is arranged within the housing to urge the second valve closure member toward the second valve seat.

11. The system of claim 8 in which the restricted connection between the third connection and the diaphragm motor means consists essentially of a single line of tubing; a check valve having a bleed by-pass disposed in the line, and means for adjustably restricting the line disposed in series with the check valve.

12. A pumping system for fluids comprising a source of pneumatic pressure; an intermitter responsive to pneumatic pressure from said source to produce a series of pressure pulses, including a housing, a first connection from the source of pneumatic pressure, a second connection to exhaust, and a third connection to output from the intermitter, a two-position valve disposed to alternate communication of the third connection with the first and second connections; pressure responsive diaphragm motor means disposed in the housing to actuate the valve comprising a main diaphragm, a movable link connected to the main diaphragm, diaphragms connected to the link and housing to form chambers within the housing permanently communicating with the first and second connections; said valve having a passageway providing communication between said chambers, a valve seat and a valve closure member cooperable therewith to control flow between said chambers; and a restricted connection between said third connection and the diaphragm motor means disposed to feed back output pressure upon a surface of said main diaphragm to actuate the valve; and a pump having a motor means responsive to pressure pulses connected to said third connection.

13. The system of claim 12 wherein two diaphragms are connected to the link and housing to form chambers and one of said diaphragms having a surface constantly exposed to pressure from said first connection and opposite surface alternately exposed to pressure from the first and second connections, whereby snap action is imparted to the valve.

14. The system of claim 12 wherein the valve has a passageway including a seat providing communication between the chambers in the housing and a valve closure member cooperating with said seat to control flow between the chambers.

References Cited in the file of this patent

UNITED STATES PATENTS

| | | |
|---|---|---|
| 2,452,143 | Pellettere | Oct. 26, 1948 |
| 2,598,535 | Green | May 27, 1952 |
| 2,652,847 | Segebarth | Sept. 22, 1953 |
| 2,693,114 | Tapp et al. | Nov. 2, 1954 |
| 2,760,511 | Greeff | Aug. 28, 1956 |
| 2,764,017 | Ronnebeck | Sept. 25, 1956 |

FOREIGN PATENTS

| | | |
|---|---|---|
| 750,018 | France | May 15, 1933 |

OTHER REFERENCES

Warren: Continuous Automatic Sampling—2, Do Not Sell Sampling Short, Oil and Gas Journal, Apr. 9, 1956, vol. 54—No. 49 (pages 93 to 97, pages 96 and 97 pertinent).